(12) United States Patent
Suzuki et al.

(10) Patent No.: US 11,883,989 B2
(45) Date of Patent: Jan. 30, 2024

(54) METHOD FOR PRODUCING PRESS MOLDED BODY

(71) Applicant: Teijin Limited, Osaka (JP)

(72) Inventors: Shuhei Suzuki, Osaka (JP); Masahiro Kitagawa, Osaka (JP); Takeru Ohki, Osaka (JP)

(73) Assignee: Teijin Limited, Osaka (JP)

( * ) Notice: Subject to any disclaimer, the term of this patent is extended or adjusted under 35 U.S.C. 154(b) by 852 days.

(21) Appl. No.: 16/956,084

(22) PCT Filed: Dec. 6, 2018

(86) PCT No.: PCT/JP2018/044944
§ 371 (c)(1),
(2) Date: Jun. 19, 2020

(87) PCT Pub. No.: WO2019/131045
PCT Pub. Date: Jul. 4, 2019

(65) Prior Publication Data
US 2023/0191667 A1    Jun. 22, 2023

(30) Foreign Application Priority Data
Dec. 26, 2017  (JP) ................. 2017-249958

(51) Int. Cl.
*B29C 43/34* (2006.01)
*B29C 43/00* (2006.01)
(Continued)

(52) U.S. Cl.
CPC ............ *B29C 43/34* (2013.01); *B29C 43/003* (2013.01); *B29C 70/345* (2013.01);
(Continued)

(58) Field of Classification Search
None
See application file for complete search history.

(56) References Cited

U.S. PATENT DOCUMENTS

| 2015/0186554 A1 | 7/2015 | Saito |
| 2017/0008260 A1 | 1/2017 | Fujii et al. |

(Continued)

FOREIGN PATENT DOCUMENTS

| EP | 3132904 A1 | 2/2017 |
| JP | H0663975 A | 3/1994 |

(Continued)

OTHER PUBLICATIONS

Communication with Supplementary EU Search Report for EP18895798.9, issued Jan. 15, 2021.
Int'l. Search Report for PCT/JP2018/044944, dated Feb. 26, 2019.

*Primary Examiner* — Robert J Grun
(74) *Attorney, Agent, or Firm* — MaxGoLaw PLLC

(57) ABSTRACT

A method for producing a press molded body is provided in which a material X that contains a thermoplastic resin $R_x$ and carbon fibers A having a weight average fiber length $L_{wA}$ and a material Y that contains a thermoplastic resin $R_y$ and carbon fibers B having a weight average fiber length $L_{wB}$ are heated, and the heated material X and material Y are pressed within a mold at the same time, thereby producing a press molded body which has a region X that is formed of the material X and a region Y that is formed of the material Y. This method for producing a press molded body is configured such that: $L_{wB}<L_{wA}$; $L_{wB}$ is from 0.1 mm to 15 mm (inclusive); and the press molded body has a transition zone XY where the region X and the region Y overlap with each other.

16 Claims, 7 Drawing Sheets

(51) Int. Cl.
    *B29C 70/34*     (2006.01)
    *B29K 101/12*     (2006.01)
    *B29K 105/08*     (2006.01)
    *B29K 105/12*     (2006.01)
    *B29K 105/26*     (2006.01)
    *B29K 307/04*     (2006.01)

(52) U.S. Cl.
    CPC .... *B29C 2791/002* (2013.01); *B29K 2101/12* (2013.01); *B29K 2105/08* (2013.01); *B29K 2105/12* (2013.01); *B29K 2105/26* (2013.01); *B29K 2307/04* (2013.01)

(56) References Cited

U.S. PATENT DOCUMENTS

| | | |
|---|---|---|
| 2018/0056553 A1 | 3/2018 | Ohtani et al. |
| 2019/0381750 A1 | 12/2019 | Oda et al. |

FOREIGN PATENT DOCUMENTS

| | | |
|---|---|---|
| JP | 201193213 A | 5/2011 |
| JP | 2012148443 A | 9/2012 |
| JP | 2013075447 A | 4/2013 |
| JP | 2013173330 A | 9/2013 |
| JP | 2013176984 A | 9/2013 |
| JP | 2016120602 A | 7/2016 |
| JP | 2016199022 A | 12/2016 |
| JP | 2018192730 A | 12/2018 |
| WO | 2015115225 A1 | 8/2015 |
| WO | 2018158882 A1 | 9/2018 |

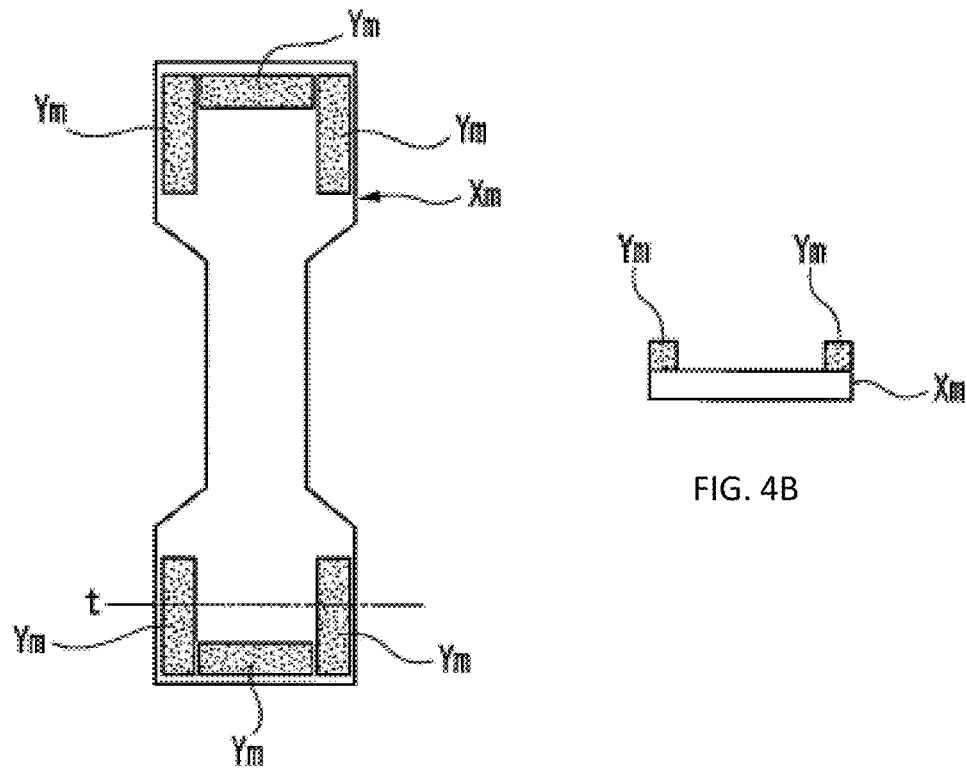
FIG. 4B
FIG. 4A
FIG. 5
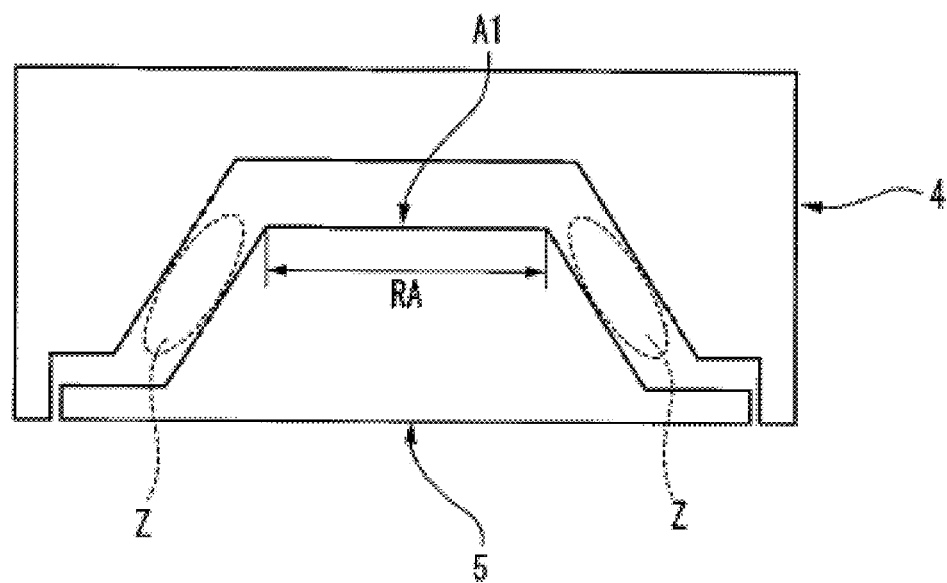

METHOD FOR PRODUCING PRESS MOLDED BODY

TECHNICAL FIELD

The present invention relates to a method for producing a press molded body.

BACKGROUND ART

A composite material that uses carbon fibers as a reinforcing material has high tensile strength and high tensile elastic modulus and a small linear expansion coefficient, and thus has excellent dimensional stability, and excellent heat resistance, chemical resistance, fatigue resistance, abrasion resistance, electromagnetic wave shielding properties, and radiolucency. Therefore, the composite material using carbon fibers as a reinforcing material is widely applied to automobiles, sports or leisure, aerospace or space, general industrial applications, and the like.

In particular, since carbon fibers are present in the thermoplastic matrix resin, the composite material containing carbon fibers and a thermoplastic resin (composite material of thermoplastic and carbon fibers) has excellent mechanical properties and application to a structural member of automobiles or the like has attracted attention.

For example, Patent Literature 1 describes a composite material in which a first substrate and a second substrate different from the first substrate are butted and joined together.

Patent Literature 2 describes a method for producing a fiber reinforced resin material having a rib structure by preparing a panel and a rib separately and then integrally molding the panel and the rib.

Patent Literature 3 describes a method for producing a molded body having a rib structure by laminating and press molding two kinds of molding material containing discontinuous reinforcing fibers and a thermoplastic resin.

CITATION LIST

Patent Literature

Patent Literature 1: JP-A-2013-75447
Patent Literature 2: JP-A-2012-148443
Patent Literature 3: JP-A-2013-176984

SUMMARY OF INVENTION

Technical Problem

However, in the invention described in Patent Literature 1, a first reinforcing substrate is prepared in advance by a paper making method, the first reinforcing substrate is arranged in an injection molding cavity, and a second material is injection molded and integrally molded, so that not only production efficiency is low, but strength of the joint portion is too low.

Similarly, the invention described in Patent Literature 2 prepares a rib material in advance by using a composite material having a short fiber length, and the rib material is bonded to a surface of the separately prepared panel, so that production efficiency is low and the strength of the joint portion is too low.

In the invention described in Patent Literature 3, a rib is prepared by alternately laminating a layer containing carbon fibers having a long carbon fiber length and a layer containing short carbon fibers, but since a fiber length of only necessary regions cannot be shortened in the method, a molded body having a complicated shape cannot be produced.

Therefore, an object of the present invention is to provide a method for producing a press molded body that can produce a press molded body having a complicated shape by using at least two kinds of material and is excellent in bonding strength between regions containing respective materials and excellent in production efficiency.

Solution to Problem

In order to solve the above problems, the present invention provides the following method.

[1]

A method for producing a press molded body, including:
heating X material containing carbon fibers A having a weight average fiber length $Lw_A$ and a thermoplastic resin $R_X$;
heating Y material containing carbon fibers B having a weight average fiber length $Lw_B$ and a thermoplastic resin $R_Y$; and
pressing the heated X material and the heated Y material simultaneously in a mold to produce the press molded body comprising an X region made of the X material and a Y region made of the Y material, wherein $$Lw_B < Lw_A,$$

$Lw_B$ is 0.1 mm or more and 15 mm or less, and
the press molded body further includes a transition segment XY in which the X region and the Y region are laminated.

[2]

The method for producing a press molded body according to [1], wherein at least one end portion of the press molded body in an in-plane direction consists of the Y region.

[3]

The method for producing a press molded body according to [2], wherein the end portion in the in-plane direction consisting only of the Y region is continuously formed with the Y region of the transition segment XY.

[4]

The method for producing a press molded body according to [2] or [3], wherein the transition segment XY has a configuration in which the X region is sandwiched by the Y regions in a thickness direction, and the end portion in the in-plane direction consisting only of the Y region is continuously formed with the Y region of the transition segment XY.

[5]

The method for producing a press molded body according to any one of [1] to [4], wherein the $Lw_A$ is 1 mm or more.

[6]

The method for producing a press molded body according to any one of [1] to [5], wherein the $Lw_A$ is 1 mm or more and 100 mm or less.

[7]

The method for producing a press molded body according to any one of [1] to [6], wherein a carbon fiber volume fraction $Vf_X$ of the X material and a carbon fiber volume fraction $Vf_Y$ of the Y material satisfy a relationship of $Vf_X \geq Vf_Y$.

[8]

The method for producing a press molded body according to any one of [1] to [7], wherein the X material has a plate shape and the Y material flows and extends in an in-plane direction of the X material to produce the press molded body.

[9]

The method for producing a press molded body according to any one of [1] to [8], wherein a linear expansion coefficient $E_X$ in a plate thickness direction of a part consisting only of the X region, a linear expansion coefficient $E_{XY}$ in a plate thickness direction of the transition segment XY, and a linear expansion coefficient $E_Y$ in a plate thickness direction of a part consisting only of the Y region satisfy a relationship of $E_X > E_{XY} > E_Y$.

[10]

The method for producing a press molded body according to any one of [1] to [9], wherein an extension rate $D_X$ of the X material is more than 0% and equal to or less than 50%, an extension rate $D_Y$ of the Y material is more than 10% and equal to or less than 60%, and $D_Y > D_X$.

[11]

The method for producing a press molded body according to any one of [1] to [10], wherein $V_X : V_Y$, which is a ratio of a volume $V_X$ of the X material to a volume $V_Y$ of the Y material, is 90:10 to 50:50.

[12]

The method for producing a press molded body according to any one of [1] to [11], wherein the $Lw_B$ is 5 mm or more and 15 mm or less.

[13]

The method for producing a press molded body according to any one of [1] to [12], wherein a shape of the X material is a shape developed by inverse molding analysis with a computer from a three-dimensional shape of the press molded body.

[14]

The method for producing a press molded body according to any one of [1] to [13], wherein the X material is cut off from a composite material containing carbon fibers and a thermoplastic resin.

[15]

The method for producing a press molded body according to [14], wherein the Y material includes a material obtained by crushing scrap pieces after the X material is cut from the composite material.

[16]

The method for producing a press molded body according to any one of [1] to [15], wherein the Y material overlaps with at least one end portion of the X material in the in-plane direction and is simultaneously pressed in molds.

[17]

The method for producing a press molded body according to any one of [1] to [16], wherein the press molded body has a flange portion, and at least one end portion of the flange portion consists of the Y region.

[18]

The method for producing a press molded body according to any one of [1] to [17], wherein the press molded body includes a part whose cross-sectional shape is a hat shape.

[19]

The method for producing a press molded body according to [18], wherein the Y material was arranged on a mold surface in a region for forming a top panel having the hat shape and pressed.

Advantageous Effects of Invention

According to the present invention, the production efficiency can be improved by simultaneously pressing two kinds of the composite material of thermoplastic and carbon fibers having different carbon fiber lengths, and bonding strength between regions made of respective materials is excellent. By placing a material having high fluidity in a necessary part, it is possible to prepare a press molded body having a complicated shape not present in the related art.

BRIEF DESCRIPTION OF DRAWINGS

FIG. 4 is a schematic view showing an example of an arrangement of X material and Y material at the time of press molding, in which (a) is a plan view, and (b) is a cross-sectional view cut along a dash-dot line t.

FIG. 5 is a schematic view showing a cross section of an example of molds.

DESCRIPTION OF EMBODIMENTS

Figure 1A:
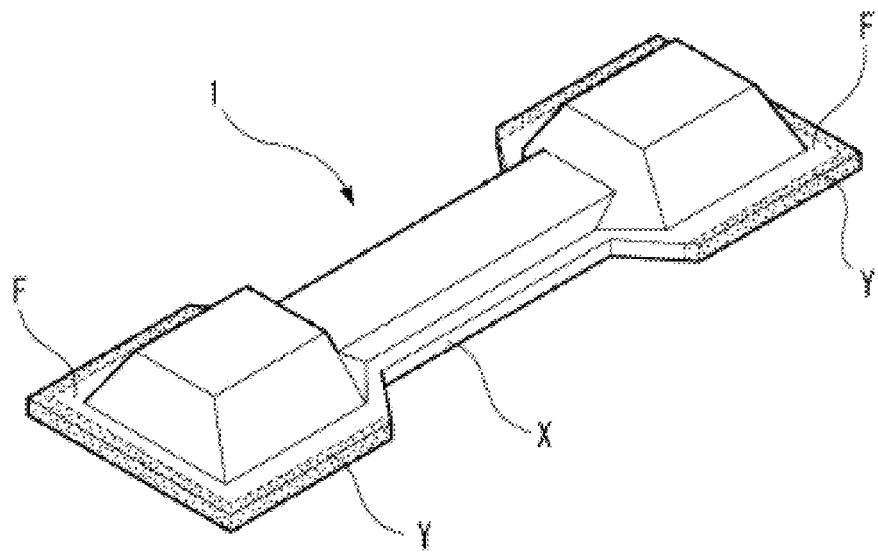
FIG. 1 is a schematic view showing an example of a press molded body, in which (a) is a perspective view, (b) is a plan view, and (c) is a cross-sectional view when cut along a dash-dot line s in (b).

Hereinafter, the present invention will be described in detail.

A method for producing a press molded body of the present invention is
  a method for producing a press molded body including:
    heating X material containing carbon fibers A having a weight average fiber length $Lw_A$ and a thermoplastic resin $R_X$; heating Y material containing carbon fibers B having a weight average fiber length $Lw_B$ and a thermoplastic resin $R_Y$; and pressing the heated X material and the heated Y material simultaneously in molds to produce the press molded body having an X region made of the X material and the Y region made of the Y material, wherein $Lw_B < Lw_A$, $Lw_B$ is 0.1 mm or more and 15 mm or less, and
the press molded body further includes a transition segment XY in which the X region and the Y region are laminated.

As described above, the method for producing the press molded body of the present invention includes: pressing the X material and the Y material simultaneously in molds, the materials each containing at least carbon fibers having weight average fiber lengths different from each other and both containing a thermoplastic resin.

The method for producing the press molded body of the present invention is excellent in production efficiency, since the X material and the Y material which contain carbon fibers and a thermoplastic resin are pressed simultaneously (hereinafter also referred to as "simultaneous pressing") in molds to obtain the molded body.

Further, the present invention is excellent in bonding strength between the X region made of the X material and the Y region made of the Y material because of the simultaneous pressing.

Further, in the present invention, since the weight average fiber length $Lw_A$ of the carbon fibers A contained in the X material and the weight average fiber length $Lw_B$ of the carbon fibers B contained in the Y material satisfy $Lw_B < Lw_A$, the Y material is easier to flow than the X material. In the present invention, since the Y material that is easy to flow can be arranged only in a necessary part and pressed, it is possible to produce a molded body having a more complicated shape.

First, the carbon fibers contained in the X material and the Y material will be described.

[Carbon Fibers]

1. Carbon Fibers in General

Polyacrylonitrile (PAN)-based carbon fibers, petroleum/coal pitch-based carbon fibers, rayon-based carbon fibers, cellulose-based carbon fibers, lignin-based carbon fibers, phenol-based carbon fibers, and the like are known as the carbon fibers used in the present invention, and any carbon fibers of these can be suitably used in the present invention. In particular, the polyacrylonitrile (PAN)-based carbon fibers are preferably used in view of excellent tensile strength in the present invention.

2. Sizing Agent of Carbon Fibers

A sizing agent may adhere to a surface of the carbon fibers used in the present invention. When the carbon fibers to which the sizing agent adheres are used, the kind of the sizing agent can be appropriately selected depending on the kind of the carbon fibers and the kind the thermoplastic resin used in the X material or the Y material, and is not particularly limited.

3. Fiber Diameter of Carbon Fibers

A fiber diameter of a single carbon fiber (in general, single fiber may be called filament) used in the present invention may be appropriately determined depending on the kind of the carbon fibers, but is not particularly limited. In general, an average fiber diameter is preferably in a range of 3 μm to 50 μm, more preferably in a range of 4 μm to 12 μm, and still more preferably in a range of 5 μm to 8 μm. When the carbon fibers have a fiber bundle shape, the average fiber diameter does not refer to a diameter of the fiber bundle, but refers to the diameter of the carbon fibers (single fibers) constituting the fiber bundle. The average fiber diameter of the carbon fibers can be measured by, for example, a method described in JIS R7607: 2000.

[Carbon Fibers A]

The X material of the present invention contains the carbon fibers A having a weight average fiber length $Lw_A$. $Lw_A$ is longer than the weight average fiber length $Lw_B$ of the carbon fibers B contained in the Y material.

The weight average fiber length $Lw_A$ of the carbon fibers A is preferably 1 mm or more, more preferably 1 mm or more and 100 mm or less, still more preferably 3 mm or more and 80 mm or less, and particularly preferably 5 mm or more and 60 mm or less. If $Lw_A$ is 100 mm or less, fluidity of the X material is hard to decrease, and a press molded body having a desired shape can be easily obtained during press molding. Further, $Lw_A$ is preferably 1 mm or more since mechanical strength of the obtained press molded body is hard to decrease.

[Weight Average Fiber Length of Carbon Fibers A]

In the present invention, carbon fibers A having different fiber lengths from each other may be used in combination. In other words, the carbon fibers A used in the present invention may have a single peak or a plurality of peaks in distribution of the weight average fiber length. The carbon fibers contained in an injection molded body or an extrusion molded body generally have a weight average fiber length of less than 1 mm, since the carbon fibers are subjected to a sufficient kneading process to uniformly disperse the carbon fibers in the injection (extrusion) molded body.

For example, the average fiber length of the carbon fibers A can be determined based on the following formula (1) by measuring the fiber length of 100 fibers randomly extracted from a molded body to a measurement unit of 1 mm using calipers or the like.

When a fiber length of an individual carbon fiber is Li and a measured number is j, a number average fiber length (Ln) and a weight average fiber length (Lw) are generally determined by the following formulas (1) and (2).

$$Ln = \Sigma Li/j \qquad \text{Formula (1)}$$

$$Lw = (\Sigma Li^2)/(\Sigma Li) \qquad \text{Formula (2)}$$

When the fiber length is constant, the number average fiber length and the weight average fiber length are the same value. The carbon fibers A can be extracted from the press molded body, for example, by applying a heating treatment to the press molded body at 500° C. for about one hour and removing the resin in a furnace.

[Carbon Fibers B]

The Y material of the present invention contains the carbon fibers B having a weight average fiber length $Lw_B$. $Lw_B$ is longer than the weight average fiber length $Lw_A$ of the carbon fibers A contained in the X material.

The weight average fiber length $Lw_B$ of the carbon fibers B is 0.1 mm or more and 15 mm or less, preferably 0.2 mm or more and 15 mm or less, more preferably 0.5 mm or more and 15 mm or less, still more preferably 5 mm or more and 15 mm or less, and particularly preferably 5 mm or more and 10 mm or less. When $Lw_B$ is 15 mm or less, fluidity of the Y material at the time of molding is good. When $Lw_B$ is 0.1 mm or more, mechanical properties of a Y region can be ensured.

[Weight Average Fiber Length of Carbon Fibers B]

In the present invention, carbon fibers B having different fiber lengths from each other may be used in combination. In other words, the carbon fibers B used in the present invention may have a single peak or a plurality of peaks in distribution of the weight average fiber length.

The weight average fiber length and number average fiber length of the carbon fibers B can be measured in the same manner as the above formulas (1) and (2). A method for measuring the fiber length of the carbon fibers B will be described later.

[Volume Fractions of Carbon Fibers in X Material and Y Material]

A carbon fiber volume fraction (Vf) of each of the X material and the Y material can be determined by the following formula (3).

There is no particular limit to the carbon fiber volume fraction, but the carbon fiber volume fraction (Vf) is preferably 10 vol % to 60 vol %, more preferably 20 vol % to 50 vol %, and still more preferably 25 vol % to 45 vol %.

Carbon fiber volume fraction($Vf$)=100×carbon fiber volume/(carbon fiber volume+thermoplastic resin volume)      Formula (3)

In the present invention, it is preferable in the production process that the carbon fiber volume fraction $Vf_X$ of the X material and the carbon fiber volume fraction $Vf_Y$ of the Y material satisfy a relationship of $Vf_X \geq Vf_Y$. If the Y material uses a material obtained by crushing scrap pieces after the X material is cut from the composite material (raw material substrate) containing carbon fibers and a thermoplastic resin, then $Vf_X = Vf_Y$; and if the Y material is produced by crushing the scrap pieces and adding a thermoplastic resin thereto, then $Vf_X > Vf_Y$. That is, if the production method which satisfies $Vf_X \geq Vf_Y$ is used, the scrap pieces after the X material is cut can be efficiently used.

Next, the thermoplastic resin contained in the X material and the Y material will be described.

[Thermoplastic Resin]

The thermoplastic resin (thermoplastic matrix resin) used in the present invention is not particularly limited, and those having a desired softening point or melting point can be appropriately selected and used. Those having a softening point in a range of 180° C. to 350° C. are generally used as the thermoplastic resin, but the present invention is not limited thereto.

Examples of the thermoplastic resin can include a polyolefin resin, a polystyrene resin, a polyamide resin, a polyester resin, a polyacetal resin (polyoxymethylene resin) and a polycarbonate resin, a (meth)acrylic resin, a polyarylate resin, a polyphenylene ether resin, a polyimide resin, a polyether nitrile resin, a phenoxy resin, a polyphenylene sulfide resin, a polysulfone resin, a polyketone resin, a polyetherketone resin, a thermoplastic urethane resin, a fluororesin, and a thermoplastic polybenzimidazole resin.

Only one kind or two or more kinds of the thermoplastic resin used in the X material and Y material of the present invention may be used. Examples of an embodiment using two or more kinds of the thermoplastic resin in combination can include an embodiment using thermoplastic resins having different softening points or melting points from each other in combination or an embodiment using thermoplastic resins having different average molecular weight from each other in combination, but are not limited thereto.

The thermoplastic resin $R_X$ contained in the X material is preferably the same kind of thermoplastic resin as the thermoplastic resin $R_Y$ contained in the Y material.

[Linear Expansion Coefficient]

In the method for producing a press molded body of the present invention, it is preferable that a linear expansion coefficient $E_X$ in a plate thickness direction of a part consisting only of the X region, a linear expansion coefficient $E_{XY}$ in a plate thickness direction of the transition segment XY, and a linear expansion coefficient $E_Y$ in a plate thickness direction of a part consisting only of the Y region preferably satisfy a relationship of $E_X > E_{XY} > E_Y$ in the obtained press molded body.

The transition segment XY of the press molded body is a part in which the X region and the Y region are laminated.

When at least one end portion in an in-plane direction of the press molded body consists of the Y region (as a preferable example, the press molded body has a flange portion and at least one end portion of the flange portion consists of the Y region) and the end portion consisting only of the Y region is fixed to another member by a screw, for example, the end portion is hard to expand or contract in the plate thickness direction due to a temperature change if the relationship of $E_X > E_{XY} > E_Y$ is satisfied (excellent dimensional stability). Thus, the end portion can be more stably fixed.

In the present invention, the weight average fiber length $Lw_A$ of the carbon fibers A contained in the X material and the weight average fiber length $Lw_B$ of the carbon fibers B contained in the Y material satisfy the relationship of $Lw_B < Lw_A$. In particular, the carbon fibers A are easy to be oriented in the in-plane direction but are difficult to be oriented in the plate thickness direction in the X material when $Lw_A$ is larger than the plate thickness of the X material. When $Lw_B$ is smaller than the plate thickness of the Y material, the carbon fibers B are easy to be oriented in the in-plane direction and the plate thickness direction in the Y material. In such a case, the relationship of $E_X > E_{XY} > E_Y$ is satisfied in many cases.

[Press Molding]

In the present invention, the X material and the Y material are heated, and the heated X material and Y material are simultaneously pressed in molds to produce a press molded body having the X region made of the X material and the Y region made of the Y material.

In the present invention, in order to obtain the press molded body having the transition segment XY, it is preferable that at least a part of the X material and at least a part of the Y material are overlapped and simultaneously pressed. In particular, in a first embodiment to be described later, it is preferable that at least one end portion of the X material in the in-plane direction and the Y material are overlapped and simultaneously pressed. As shown in FIG. 4, overlapping of at least one end portion of the X material in the in-plane direction and the Y material does not require that the Y material completely cover the end portion of the X material. A longitudinal direction of the Y material may be arranged along the end portion of the X material. The Y material may be arranged in a position preferably within 10 cm, and more preferably within 5 cm from the end portion of the X material.

$V_X:V_Y$ is preferably 90:10 to 50:50, and more preferably 80:20 to 60:40, which is a ratio of a volume $V_X$ of the X material to a volume $V_Y$ of the Y material, the materials being used in the method for producing the press molded body of the present invention.

When $V_X:V_Y$ is 90:10 to 50:50, for example, a main part of the press molded body can be formed by using the X material, and only a necessary part (such as end portions or small portions) can be formed by using the Y material having high fluidity.

As the molding method of the present invention, press molding (which may be called compression molding) is used, and a molding method such as hot press molding or cold press molding can be used.

In the present invention, press molding using a cold press is particularly preferable. In a cold press method, for example, the composite material of thermoplastic and carbon fibers (sometimes referred to as a general term of the X material and the Y material) heated to a first predetermined temperature is put into molds set to a second predetermined temperature, and then pressurization and cooling are performed.

Specifically, when the thermoplastic resin constituting the composite material of thermoplastic and carbon fibers is crystalline, a first predetermined temperature is equal to or higher than a melting point, and a second predetermined temperature is lower than the melting point. When the thermoplastic resin is amorphous, a first predetermined temperature is equal to or higher than a glass transition temperature, and a second predetermined temperature is lower than the glass transition temperature. That is, the cold pressing method includes at least the following steps A-1 to A-2.

Step A-1) A step of heating the composite material of thermoplastic and carbon fibers to the melting point or higher and a decomposition temperature or lower when the thermoplastic resin is crystalline and to the glass transition temperature or higher and the decomposition temperature or lower when the thermoplastic matrix resin is amorphous.

Step A-2) A step of arranging the composite material of thermoplastic and carbon fibers heated in the above step A-1) in a mold in which a temperature is adjusted to less than a melting point when the thermoplastic resin is crystalline and less than a glass transition temperature when the thermoplastic resin is amorphous, and pressurizing the composite material of thermoplastic and carbon fibers. By performing these steps, molding of the composite material of thermoplastic and carbon fibers can be completed (the press molded body can be produced).

The above steps need to be performed in the above order, but may include other steps between the steps. Other steps include, for example, a shaping step of shaping the composite material into a cavity shape of the mold in advance by using a shaping mold different from the mold used in the step A-2) before the step A-2). The step A-2) is a step of obtaining the molded body having a desired shape by applying pressure to the composite material of thermoplastic and carbon fibers, but a molding pressure at this time is not particularly limited, and is preferably less than 20 MPa, and more preferably 10 MPa or less with respect to a projection area of the mold cavity. As a matter of course, various steps may be included between the above steps at the time of press molding. For example, vacuum compression molding may be used in which press molding is performed under vacuum.

In the present invention, it is preferable that the X material has a plate shape and the Y material flows in the in-plane direction of the X material to extend the plane to produce the press molded body.

In the present invention, an extension rate $D_X$ of the X material is more than 0% and equal to or less than 50%, an extension rate $D_Y$ of the Y material is more than 10% and equal to or less than 60%, and $D_Y > D_X$ is preferable. The Y material is easy to flow in the in-plane direction of the X material as long as the Y material has a high extension rate.

A method for measuring the extension rate will be described later.

A shape of the X material is preferably a shape developed by inverse molding analysis with a computer from a three-dimensional shape of the press molded body to be produced.

The X material is preferably cut off from the composite material (raw material substrate) containing carbon fibers and a thermoplastic resin. The raw material substrate is preferably in a plate shape, and the X material is also preferably in a plate shape.

In view of reducing loss of the raw material substrate, it is preferable that the Y material contains a material obtained by crushing the scrap pieces after the X material is cut from the raw material substrate.

[Shape of Press Molded Body]

A shape of the press molded body produced by the present invention is not particularly limited. The press molded body produced by the present invention preferably has at least one planar portion having at least one thickness (plate thickness). A cross-sectional shape of the press molded body may be a T-shape, an L-shape, a U-shape, a hat shape, and the press molded body may have a three-dimensional shape including these shapes, and may further include an uneven shape (such as a rib or a boss). The shape of the press molded body produced by the present invention preferably includes a part having a cross-sectional shape being the hat shape.

Figure 1B:
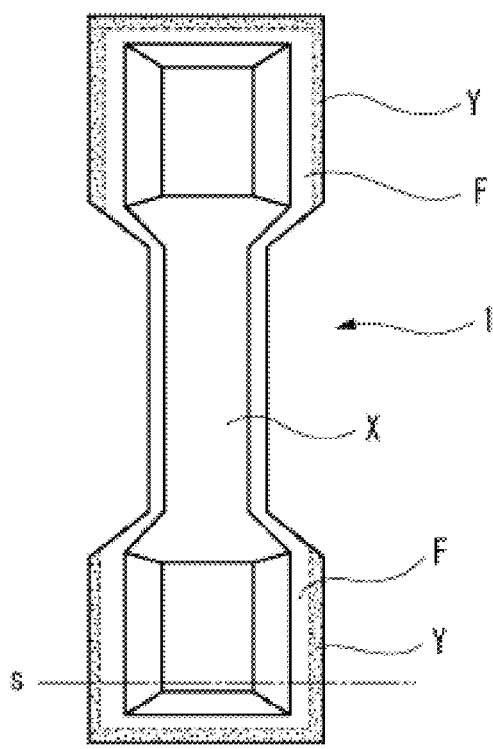
Figure 1C:
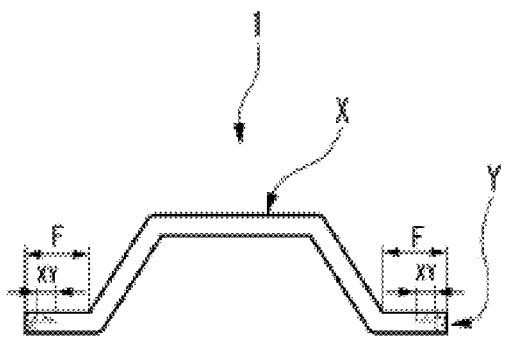
Figure 8:
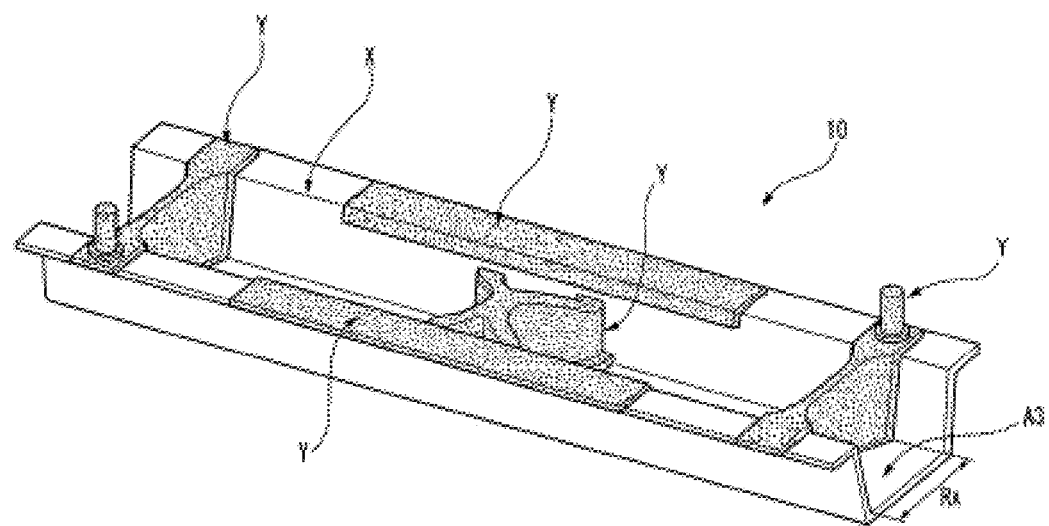
FIG. 8 is a schematic view showing an example of the press molded body.

Examples of the press molded body produced by the present invention include the press molded body shown in FIG. 1 and the press molded body shown in FIG. 8.

FIG. 1 is a schematic view of a press molded body including a part whose cross-sectional shape is a hat shape, in which (a) of FIG. 1 is a perspective view of the press molded body, (b) of FIG. 1 is a plan view of the press molded body, and (c) of FIG. 1 is a cross-sectional view (hat shape) when the press molded body is cut along a dash-dot line s in (b) of FIG. 1. The press molded body of FIG. 1 has an X region (sign X in FIG. 1) and a Y region (sign Y in FIG. 1), and has a transition segment XY as denoted by a sign XY in (c) of FIG. 1.

FIG. 8 is a schematic view of a press molded body having a hat shaped cross section and a structure of a complicated shape inside. The press molded body of FIG. 8 has an X region (sign X in FIG. 8) and Y regions (signs Y in FIG. 8), and has a transition segment XY since the Y regions in FIG. 8 are all laminated with the X region.

It is preferable that the press molded body produced by the present invention has a part in which thicknesses of the transition segment XY and a part which is not the transition segment XY and adjacent to the transition segment XY are uniform. The uniform thickness refers to: that the thickness is substantially constant; or that the thickness is changed but a change rate thereof is substantially constant. As shown in FIG. 4 to be described in detail later, by arranging and simultaneously pressing the X material and the Y material, the press molded body having a part in which thicknesses of the transition segment XY and a part which is not the transition segment XY and adjacent to the transition segment XY are uniform can be obtained. For example, in a press molded body having a protruded portion such as a rib formed on a flat plate, a part including the protruded portion and an area around the protruded portion is not the part having a uniform thickness.

Next, a more preferable embodiment of the present invention will be described.

A preferable embodiment of the present invention shown below is referred to as a "first embodiment".

First Embodiment

In the first embodiment, at least one end portion of the press molded body in the in-plane direction consists of the Y region. It is more preferable that the X material has a plate shape and the Y material flows in the in-plane direction of the X material and is extended to produce the press molded body.

A reason why the first embodiment is excellent will be described in detail below.

In general, press molding is a molding method for obtaining a molded body having a desired shape by heating the plate-shaped molding material and pressing the heated molding material by sandwiching the molding material with molds. When the molding material consists of the thermoplastic resin, since the molding material is easy to flow at the time of press molding, a molded body having a complicated shape can be easily produced. However, when the molding material is a composite material of thermoplastic and carbon fibers, the longer the fiber length of the carbon fiber is, the more difficult it is to flow, and when an orientation direction of the carbon fibers in the composite material of thermoplastic and carbon fibers is adjusted, for example, to improve performance of the press molded body, such problems may occur: the orientation direction of the carbon fibers are disturbed when the carbon fibers flow excessively, and the purpose of improving the performance of the obtained press molded body cannot be sufficiently achieved.

Therefore, it is preferable that the composite material of thermoplastic and carbon fibers provided for press molding is cut into a pattern shape (also referred to as "pattern cut") when cut off from the raw material substrate (the composite material containing carbon fibers and a thermoplastic resin) such that the press molded body having a desired shape can be obtained without too much flow.

A pattern cut shape (shape of the X material) is preferably a shape developed by inverse molding analysis with a computer from a three-dimensional shape of the press molded body to be produced.

However, when the composite material of thermoplastic and carbon fibers provided for press molding is cut from the raw material substrate, the scrap pieces (parts other than the composite material of thermoplastic and carbon fibers for press molding cut from the raw material substrate) are generated. Since the generation of the scrap pieces becomes loss of the material, the present inventors have focused on a reason of reduction in production efficiency in the production process of the press molded body.

Therefore, the present inventors have conducted intensive studies and it is considered that the production efficiency can be increased if the amount of scrap pieces to be generated can be reduced (the number of the composite material of thermoplastic and carbon fibers cut from one sheet of the raw material substrate is increased). "The number of the composite materials of thermoplastic and carbon fibers cut from one sheet of the raw material substrate is increased" above includes not only increasing the number of the cut composite materials having one kind of shape, but also increasing a total number of the cut composite materials having two or more different kinds of shapes.

Then, by studying a method for cutting the composite material of thermoplastic and carbon fibers (X material in the present invention) from the raw material substrate, it is possible to increase the production efficiency.

Figure 2:
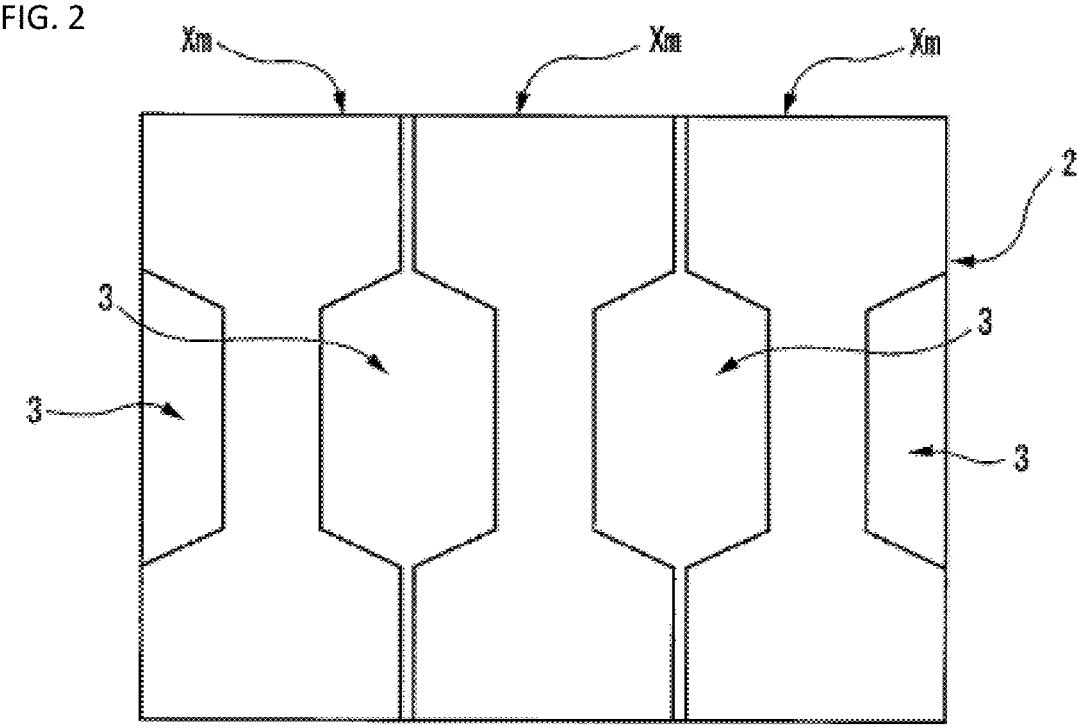
FIG. 2 is a schematic view showing a method for cutting X material from a raw material substrate.

For example, it is desirable to cut the composite material of thermoplastic and carbon fibers into a shape such as Xm shown in FIG. 2 when a press molded body including a part having a hat shaped cross section shown in FIG. 1 is produced. A sign 2 in FIG. 2 denotes the raw material substrate. In this case, when the composite material of thermoplastic and carbon fibers is pattern cut into the shape shown in FIG. 2, a large amount of the scrap pieces (sign 3 in FIG. 2) is generated.

Figure 3:
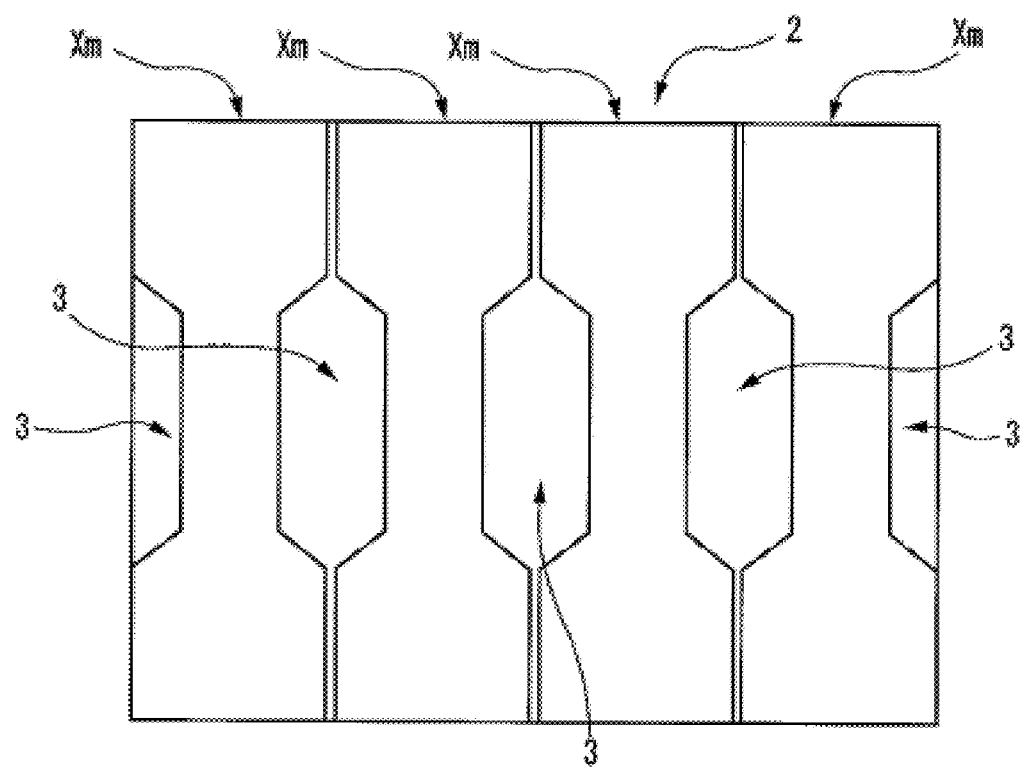
FIG. 3 is a schematic view showing a method for cutting X material from the raw material substrate.

In contrast, in a preferable embodiment of the present invention, the composite material of thermoplastic and carbon fibers (X material) is pattern cut into a shape such as Xm shown in FIG. 3 and used when a press molded body including a part having a hat shaped cross section shown in FIG. 1 is produced. A sign 2 in FIG. 3 denotes the raw material substrate. When the composite material of thermoplastic and carbon fibers is pattern cut into a shape shown in FIG. 3, the amount of the scrap pieces (sign 3 in FIG. 3) to be generated is smaller than that in the case of FIG. 2. By devising the shape of the pattern cut in this manner, the number of composite materials of thermoplastic and carbon fibers (X materials) obtained from one raw material substrate can be increased, and the amount of the scrap pieces to be generated can be reduced.

In the first embodiment of the present invention, in order to produce a press molded body having a desired shape by using the composite material of thermoplastic and carbon fibers (X material) having a shape as shown in FIG. 3, it is preferable to overlap and simultaneously press at least one end portion of the X material in the in-plane direction and the Y material prepared separately. As described above, it is not necessary to completely overlap the Y material with the end portion of the X material regarding that at least one end portion of the X material in the in-plane direction and the Y material are overlapped and pressed.

That is, in order to produce the press molded body of FIG. 1, it is preferable to produce the press molded body by arranging and simultaneously pressing the X material (Xm) and the Y material (Ym) as shown in FIG. 4. The press molded body produced in this manner has the X region made of the X material, the Y region made of the Y material, and the transition segment XY where the X region and the Y region are laminated, and at least one end portion in the in-plane direction consists only of the Y region.

In the first embodiment, at least one end portion of the press molded body in the in-plane direction (desirably a corner of an end in the press molded body having the corner of the end in the in-plane direction) consisting only of the Y region suppresses deficits of the end portion (that is, dimensional stability is excellent). This is because, as described above, since the Y material is easier to flow than the X material, deficits can be suppressed by flowing to an end of the mold in press molding.

Further, since the weight average fiber length $Lw_B$ of the carbon fibers B contained in the Y material is 0.1 mm or more, it is preferable that burr at the end portion can be prevented from generation.

In the press molded body of the first embodiment, as shown in FIG. 1, it is preferable that the end portion in the in-plane direction consisting only of the Y region is formed continuously with the Y region of the transition segment XY.

The press molded body of the first embodiment is preferably an embodiment in which the transition segment XY preferably has a configuration in which the X region is sandwiched by the Y regions in the thickness direction, and in which the end portion in the in-plane direction consisting only of the Y region is formed continuously with the Y region of the transition segment XY (hereinafter, the embodiment is also referred to as "embodiment 1a").

Figure 13:
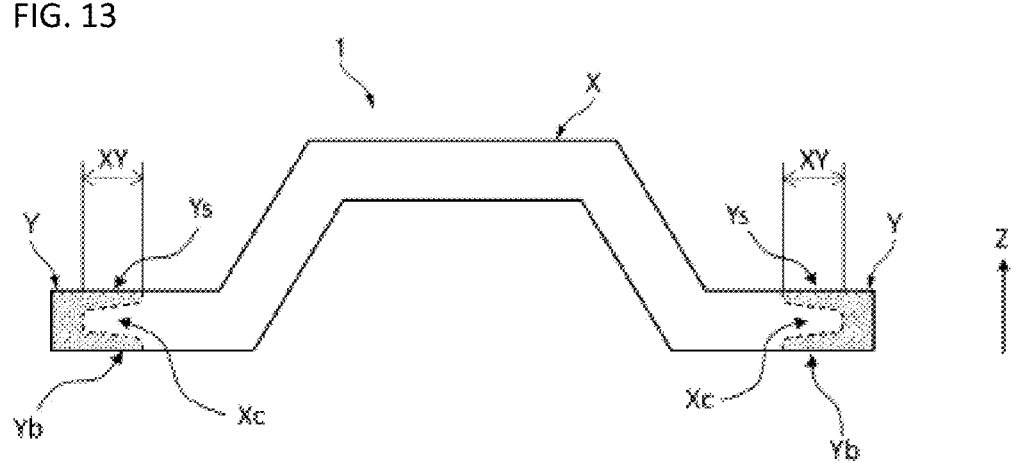
FIG. 13 is a cross-sectional schematic view showing an example of the press molded body.

A schematic view of an example of the press molded body of an embodiment 1a is shown in FIG. 13. FIG. 13 is a schematic cross-sectional view showing an example of a press molded body, and similarly to (c) of FIG. 1, a cross-sectional view when the press molded body including a part whose cross-sectional shape is a hat shape is cut at a place corresponding to the dash-dot line sin (b) of FIG. 1.

In the press molded body 1 of FIG. 13, the transition segment XY denoted by the sign XY has a configuration in which the X region (Xc) is sandwiched by the Y regions (Ys and Yb) in the thickness direction (Z axis direction in FIG.

13), and the end portion in the in-plane direction consisting only of the Y region is formed continuously with the Y regions (Ys and Yb) of the transition segment XY.

The press molded body of the embodiment 1a can be obtained by, for example, arranging and simultaneously pressing the X material and the Y material as shown in FIG. 4. In this case, during the simultaneous pressing, the Y material that is easy to flow flows ahead of the X material. Therefore, when a surface of the X material on which the Y material is arranged before pressing is a front surface and a surface opposite to the front surface is a back surface, the Y material flows from the front surface to the end portion and flows to the back surface, and the press molded body of the embodiment 1a is formed. Since not only the end portion and the front surface continuing thereto but also the back surface of the press molded body of the embodiment 1a are formed from the Y material, a portion of the back surface is expected to have an excellent surface appearance and the press molded body is expected to be applied in a wider range.

The press molded body of the first embodiment has a flange portion, and at least one end portion of the flange portion in the in-plane direction preferably consists of the Y region. The flange portion is a part corresponding to a brim of a hat in a part whose cross-sectional shape is a hat shape, and is a part denoted by a sign F in FIG. 1. As shown in (c) of FIG. 1, the press molded body of FIG. 1 has a part in which an end portion of a flange portion F in the in-plane direction consists of the Y region.

In FIG. 4, the X material is cut in the shape shown in FIG. 3 (Xm in FIG. 3), and the Y materials are prepared separately. The method for producing the Y material is not particularly limited, and may use, for example, the same raw material substrate as the X material by crushing to shorten the fiber length of the carbon fibers, and forming the material into a sheet shape with various forming methods. The scrap pieces generated when the X material is cut may be crushed and prepared in the same manner as described above.

The raw material substrate is not particularly limited and can be produced by a publicly known method. For example, opened carbon fiber bundle may be impregnated with a thermoplastic matrix resin in advance and then cut to produce the raw material substrate.

Next, another preferable embodiment of the present invention will be described.

A preferable embodiment of the present invention shown below is referred to as a "second embodiment".

Second Embodiment

The second embodiment is preferably a method for producing the press molded body in which a press molded body to be produced includes a part having a cross-section having a hat shape, and the method includes arranging the Y material so as to fit on a mold surface for forming a top panel of the hat shape and pressing the Y material. In the second embodiment, a width of the Y material is preferably equal to or less than a width of the mold surface for forming the top panel of the hat shape. When the cross-section has a hat shape, a cross-section of the molded body in a transverse direction preferably includes the hat-shaped part.

For example, in the press molded body 10 including the part whose cross-section shown in FIG. 8 has a hat shape, a part denoted by A3 is the top panel, and RA is a width of the top panel. A reason why the second embodiment is excellent will be described below.

Figure 6:
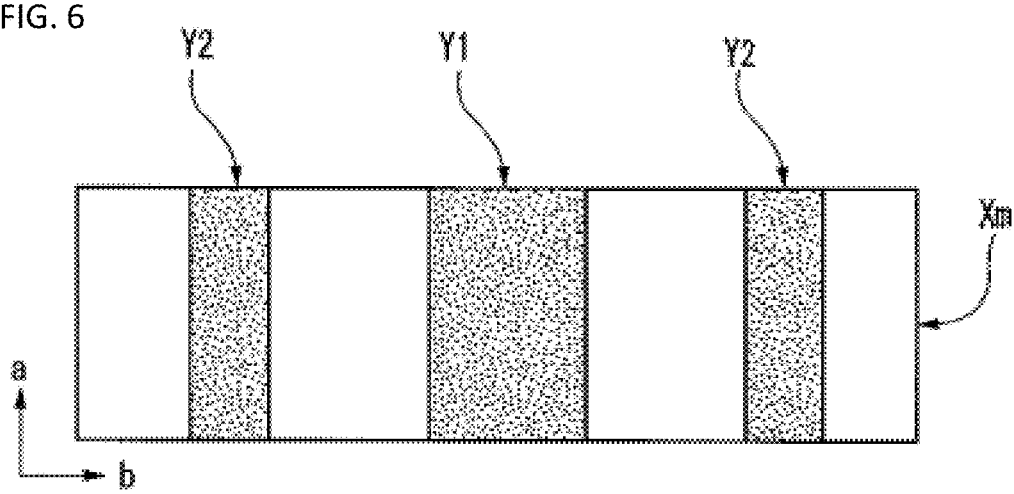
FIG. 6 is a schematic view showing an example of an arrangement of X material and Y material at the time of press molding.

For example, in a case of producing the press molded body including a part whose cross-section has a hat shape by using molds (upper mold 4 and lower mold 5) having cross-sectional shapes shown in FIG. 5, it can be considered that the X material (Xm) and the Y material (Y1 and Y2) are arranged as shown in FIG. 6 and simultaneously pressed. However, when pressed in such an arrangement, a region where both the X material and the Y material are present and a region where only the X material are mixed. Since a pressure is not uniformly applied to a region that becomes a side surface of the press molded body (in particular, a part surrounded by a dotted line Z in FIG. 5), the present inventors have focused on that a high pressure needs to be applied in order to obtain a press molded body having a desired shape.

FIG. 5 is a schematic view showing cross sections of molds, in which a back direction of a paper surface is a longitudinal direction of the upper mold 4 and the lower mold 5. FIG. 6 is a plan view showing a state in which the X material and the Y material are laminated and arranged, and a direction a in FIG. 6 is the transverse direction, and a direction b is the longitudinal direction. When a molding material having the arrangement of FIG. 6 is molded by using the molds of FIG. 5, a back direction of the paper surface in FIG. 5 and the direction b in FIG. 6 are aligned.

In FIG. 5, since a pressure is applied in a vertical direction at the time of pressing, a direction in which the pressure is applied coincides with a plate thickness direction in a region that becomes the top panel and a region that becomes a flange portion. Thus, the above problem is difficult to occur. In the region that becomes the side surface, since the plate thickness direction is different from the direction in which the pressure is applied, the pressure in the plate thickness direction is low. Thus, the pressure required for molding becomes high.

Figure 7:
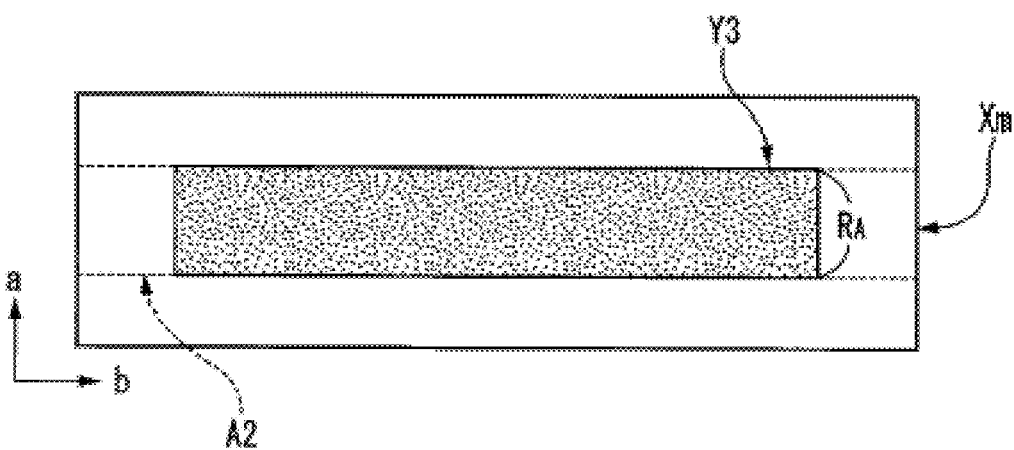
FIG. 7 is a schematic view showing an example of an arrangement of X material and Y material at the time of press molding.

Therefore, the present inventors have conducted intensive studies. When producing the press molded body including a part whose cross-section has a hat shape, a desired press molded body can be molded at a lower pressure by arranging a Y material (Y3) within a range of the region (A2) that forms the top panel of the hat shape in the molds and pressing the Y material having a width (RA) equal to or less than a width of the top panel of the hat shape as shown in FIG. 7, since the pressure is uniformly applied to the region that becomes the side surface of the press molded body (in particular, the part surrounded by the dotted line Z in FIG. 5). In the same manner as described above, when a molding material having the arrangement of FIG. 7 is molded by using the molds of FIG. 5, a back direction of the paper surface in FIG. 5 and the direction b in FIG. 7 are aligned.

According to the second embodiment, for example, a hat-shaped press molded body having a complicated structure shown in FIG. 8 can be produced.

Although the second embodiment regards a case in which the cross-sectional shape of the press molded body includes a part having a cross-section having a hat shape, the shape of the press molded body in the present invention is not limited to a shape including a part having a cross-section having a hat shape, and it is needless to say that any shape can be applied to the press molded body as long as the pressure can be uniformly applied in the same surface.

EXAMPLES

Hereinafter, the invention will be described in detail with reference to examples, but the invention is not limited thereto.

1. Raw materials used in the following Production Examples and Examples are as follows. A decomposition temperature is a measurement result of thermogravimetric analysis.

(PAN-Based Carbon Fibers)

Carbon fiber "TENAX" (registered trademark) STS40-24KS (average fiber diameter 7 μm) manufactured by Toho Tenax (THERMOPLASTIC RESIN)

Polyamide 6: may be abbreviated as PA 6 in some cases below.

Crystalline resin, melting point: 225° C., decomposition temperature (in air): 300° C.

2. Evaluation Method 2.1 Analysis of Carbon Fiber Volume Fraction (Vf)

Samples were cut from the X region and Y region of the pressed body respectively; the thermoplastic resins were removed by burning in a furnace at 500° C. for 1 hour; and masses of the carbon fibers and thermoplastic resin were calculated by weighing masses of the samples before and after the treatment. Next, volume fractions of the carbon fibers and the thermoplastic resin were calculated using specific gravity of each component.

$Vf = 100 \times $ carbon fiber volume/(carbon fiber volume + thermoplastic resin volume)

2.2 Analysis of Weight Average Fiber Length

The weight average fiber lengths of the carbon fibers contained in the X material, the Y material, and the press molded body are measured by removing the thermoplastic resin in a furnace at 500° C. for about one hour.

2.2.1 Carbon Fibers a Contained in X Material

The thermoplastic resin contained in the X material was removed, then 100 carbon fibers were randomly extracted and lengths of the carbon fibers were measured and recorded to a unit of 1 mm with calipers, and the weight average fiber length ($Lw_A$) was determined by the following formula from the measured lengths of all the carbon fibers (Li, where i represents an integer of 1 to 100).

$Lw_A = (\Sigma Li^2)/(\Sigma Li)$     Formula (2)

The weight average fiber length of the carbon fibers A contained in the X region of the press molded body can also be measured by the same method as described above after removing the thermoplastic resin contained in the X region.

2.2.2 Carbon Fibers B Contained in Y Material

The thermoplastic resin was removed, and then the obtained carbon fibers were put into water containing a surfactant and sufficiently stirred by ultrasonic vibration. The stirred dispersion liquid was randomly picked by a measuring spoon to obtain a sample for evaluation, and lengths of 3000 fibers were measured by an image analysis device Luzex AP manufactured by Nireco Corporation.

A number average fiber length $Ln_B$ and a weight average fiber length $Lw_B$ were determined in the same manner as the above formulas (1) and (2) by using the measured value of the carbon fiber length.

Only the carbon fibers B of Examples 2, 4, 5, 7 and Comparative Example 3 were measured by a method of 2.2.2, and the carbon fibers B of Examples 1, 3, 6 and Comparative Example 2 were measured by the method of 2.2.1.

2.3. Measurement of Extension Rates of X Material and Y Material (1) The X material (or Y material) is cut to 200 mm×200 mm (2) The X material (or Y material) is measured with a micrometer (OMC-150MX manufactured by Mitutoyo Corporation) at any 9 points, and an average plate thickness $T_1$ is calculated.

Figure 9:
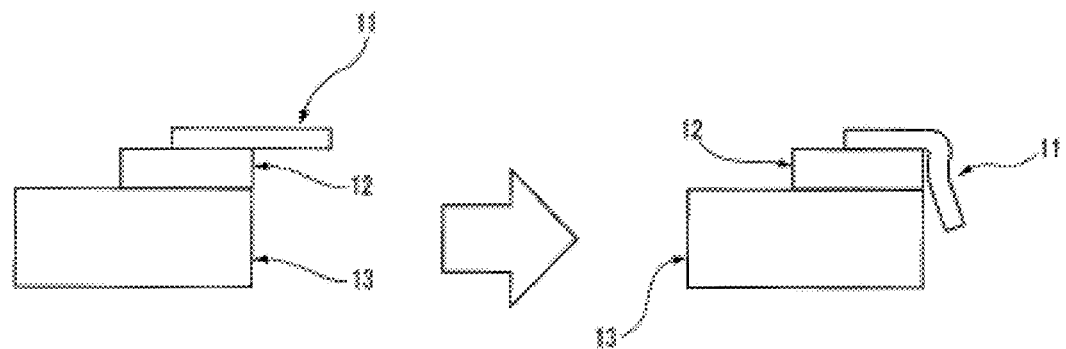
FIG. 9 is a schematic diagram for illustrating a method for measuring an extension rate.

(3) As shown in FIG. 9, a range of 100 mm×200 mm, which is half of the region of the X material (or Y material) (sign 11 in FIG. 9), is placed on a wire mesh (sign 12 in FIG. 9), the wire mesh is placed on a mounting table (sign 13 in FIG. 9) made of a metal block and heated with an IR oven (infrared heater), a temperature is measured when height of the X material (or Y material) downs 10 mm from the original height due to its own weight as an elastic modulus of the X material (or Y material) decreases, and the temperature at this time is set as a softening temperature.

This temperature+50° C. is set as a heating temperature after (4).

(4) The X material (or Y material) heated to the softening temperature+50° C. is taken out from the IR oven, and the X material (or Y material) is installed in molds heated to 150° C. after 20 seconds, and a flat plate-shaped molding plate is produced by a hydraulic press.

(5) At this time, molding conditions are as follows.

Press descending speed: 100 mm/sec

Mold clamping speed: 10 mm/sec

Molding load: 80 ton

Distance between upper mold and lower mold before upper mold descends: 600 mm

Molds: open cavity (6) After molding is completed, the molded body is taken out, and a thickness of the flat plate-shaped molded body is measured by the same measurement method as the above (2), and an average plate thickness $T_2$ is calculated.

(7) The following values are calculated from $T_1$ and $T_2$.

Extension rate (%)=$(1-T_2/T_1) \times 100$ 2.4. Amount of Scrap Pieces

Figure 10:
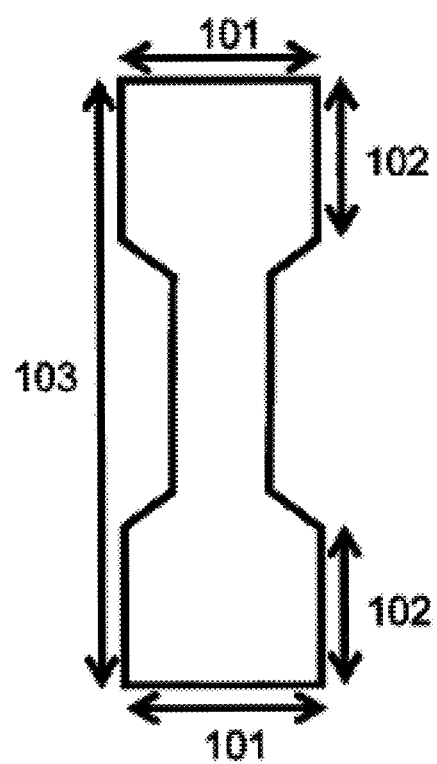
FIG. 10 is a schematic view showing an example of a shape (pattern cut shape) of an X material cut from a plate-shaped raw material substrate.
Figure 11:
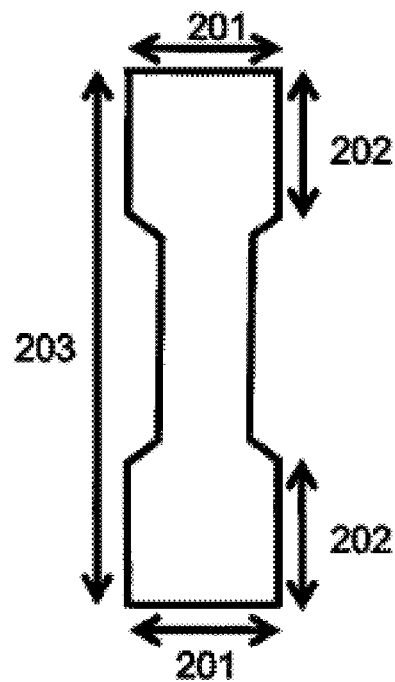
FIG. 11 is a schematic view showing an example of a shape (pattern cut shape) of an X material cut from a plate-shaped raw material substrate.
Figure 12:
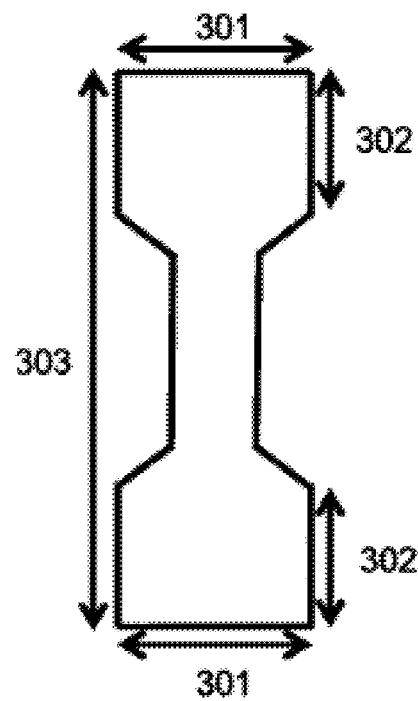
FIG. 12 is a schematic view showing an example of a shape (pattern cut shape) of an X material cut from a plate-shaped raw material substrate.

The X material was cut off from a plate-shaped composite material (raw material substrate) of a width of 390 mm× a length of 600 mm as shown in FIGS. 10 to 12. The number of sheets of the X material cut off was measured.

Excellent: Three sheets of the X material were cut off (the amount of scrap pieces was considerably small)

Good: Two sheets of the X material were cut off (the amount of scrap pieces was small).

Bad: One sheet of the X material was cut off (the amount of scrap pieces was large).

2.5. Dimensional Stability of Corner of End of Press Molded Body in In-Plane Direction Dimensional stability of a corner (a corner of an end of the flange portion F in FIG. 1) of an end of the press molded body in the in-plane direction was evaluated based on the following criteria.

A state where "there is a deficit" at the corner of the end of the press molded body in the in-plane direction means a state in which the corner of the end of the press molded body in the in-plane direction does not become an originally intended shape (shape of the mold) due to insufficient flow of the molding material.

Excellent: There is entirely no deficit at the corner of the end of the press molded body in the in-plane direction.
Good: There is a slight deficit at the corner of the end of the press molded body in the in-plane direction.
Bad: There is a large deficit at the corner of the end of the press molded body in the in-plane direction.

2.6. Generation Amount of Burr at End Portion of Press Molded Body in In-Plane Direction When a shear edge clearance between the upper mold and the lower mold of the molds was set as 0.1 mm, lengths of the burr generated at an end portion of the press molded body in a direction perpendicular to the in-plane direction (heights of the burr from the end portion the flange portion F in FIG. 1 in the direction perpendicular to the in-plane direction) were measured at 10 points randomly using a ruler, a maximum length was used as an index and evaluated based on the following criteria.

Excellent: 0 mm or more and less than 0.5 mm
Good: 0.5 mm or more and less than 1.5 mm
Bad: 1.5 mm or more Example 1

(Method for Producing Raw Material Substrate)

Carbon fibers "Tenax" (registered trademark) STS 40-24K (average fiber diameter: 7 μm, single fiber number: 24,000) manufactured by Toho Tenax cut to a fiber length of 20 mm were used as carbon fibers; a nylon 6 resin A1030 manufactured by Unitika Corporation was used as a resin; and a composite material of the carbon fibers and the nylon 6 resin in which the carbon fibers were oriented in two dimensions randomly was prepared based on the method described in U.S. Pat. No. 8,946,342. The obtained composite material was heated at 2.0 MPa for 5 minutes with a press device heated to 260° C. to obtain a plate-shaped raw material substrate having an average thickness of 2.5 mm, a width of 390 mm, and a length of 600 mm. When carbon fibers contained in the plate-shaped raw material substrate were analyzed, the carbon fiber volume fraction (Vf) was 35%, the fiber length of the carbon fibers was a fixed length, and the weight average fiber length was 20 mm (Preparation of X Material)

The X material was cut from the plate-shaped raw material substrate and prepared as shown in FIG. 10. FIG. 10 is a plan view of the cut X material. A length 101 is 160 mm, a length 102 is 130 mm, and a length 103 is 560 mm (Production of Y Material)

Extra raw material substrate was prepared and pulverized finely to a 14 mm square by using a large low-speed plastic pulverizer to obtain particle material R. The particle material R was collected and press molded (heated at 2.0 MPa for 5 minutes with a press device heated to 260° C.), and a Y material having a thickness of 1.6 mm was prepared. The weight average fiber length $Lw_B$ contained in the Y material was measured to be 10 mm (Preparation of Press Molded Body)

After drying the X material and the Y material for 4 hours with a hot air drier at 120° C., the temperature was raised to 275° C. by an infrared heater, and the X material and the Y material were arranged as shown in FIG. 4. The X material and the Y material were pressurized for one minute at a press pressure of 20 MPa (one-second time from start of pressurization to 20 MPa) and simultaneously pressed to produce the press molded body having a shape shown in FIG. 1. The results are shown in Table 1.

An extension rate $D_X$ of the X material was 15%, and an extension rate $D_Y$ of the Y material was 25%.

Example 2

A press molded body was produced in the same manner as in Example 1 except that the X material was cut as shown in FIG. 11 and the Y material was prepared as follows. FIG. 11 is a plan view of the cut X material. A length 201 is 130 mm, a length 202 is 115 mm, and a length 203 is 530 mm. The results are shown in Table 1.

(Preparation of Y Material)

Extra raw material substrate was prepared and pulverized finely by using a large low-speed plastic pulverizer to obtain a particle material R. The obtained particle material R was put into a TEM26S twin-screw extruder manufactured by Toshiba Machine Co., Ltd., melt-kneaded at a cylinder temperature of 280° C. and a screw rotation number of 100 rpm, and extruded to obtain a resin sheet (thickness: 2.0 mm) containing carbon fibers having a weight average fiber length of 0.2 mm. The resin sheet was used as the Y material.

An extension rate $D_X$ of the X material was 15%, and an extension rate $D_Y$ of the Y material was 40%.

Example 3

A press molded body was prepared in the same manner as in Example 1, except that the carbon fibers contained in the X material had a fixed length of 80 mm (a weight average fiber length of 80 mm). The results are shown in Table 1.

An extension rate $D_Y$ of the Y material was 25%.

Example 4

A press molded body was produced in the same manner as in Example 2, except that the carbon fibers contained in the X material had a fixed length of 80 mm (a weight average fiber length of 80 mm). The results are shown in Table 1.

An extension rate $D_Y$ of the Y material was 40%.

Example 5

A press molded body was produced in the same manner as in Example 2, except that the carbon fibers contained in the X material had a fixed length of 5 mm (a weight average fiber length of 5 mm). The results are shown in Table 1.

An extension rate $D_X$ of the X material was 30%, and an extension rate $D_Y$ of the Y material was 40%.

Example 6

A press molded body was produced in the same manner as in Example 1, except that the X material was obtained by overlapping eight sheets of a W-3101 continuous fiber fabric manufactured by Toho Tenax together. The results are shown in Table 1.

An extension rate $D_X$ of the X material was 0%, and an extension rate $D_Y$ of the Y material was 25%.

Example 7

A press molded body was produced in the same manner as in Example 2, except that when the obtained particle material R was put into a twin-screw extruder at a stage of producing the Y material in Example 1, an additional nylon 6 resin was put in such that the carbon fiber volume fraction Vf was 10% to prepare the Y material. The results are shown in Table 1.

An extension rate $D_X$ of the X material was 15%.

Comparative Example 1

A press molded body was produced in the same manner as in Example 1 except that the Y material was not used and the X material was cut from the plate-shaped raw material Comparative Example 3

A press molded body was produced in the same manner as in Example 1, except that kneading conditions at the time of twin-screw extrusion was increased to set the weight average fiber length of the carbon fibers to 0.05 mm at the production stage of the Y material in Example 2. The results are shown in Table 1.

An extension rate $D_X$ of the X material was 15%.

|  |  | Example 1 | Example 2 | Example 3 | Example 4 | Example 5 | Example 6 | Example 7 | Comparative Example 1 | Comparative Example 3 |
|---|---|---|---|---|---|---|---|---|---|---|
| X material | Weight average fiber length (mm) of carbon fibers A | 20 | 20 | 80 | 80 | 5 | Continuous fiber | 20 | 20 | 20 |
|  | Carbon fiber volume fraction $Vf_X$ (%) | 35 | 35 | 35 | 35 | 35 | 50 | 35 | 35 | 35 |
| Y material | Weight average fiber length (mm) of carbon fibers B | 10 | 0.2 | 10 | 0.2 | 0.2 | 10 | 0.2 | 0 | 0.05 |
|  | Carbon fiber volume fraction $Vf_Y$ (%) | 35 | 35 | 35 | 35 | 35 | 35 | 10 | 0 | 35 |
| Generation amount of burr at end portion of press molded body |  | Excellent | Good | Excellent | Good | Good | Excellent | Good | Excellent | Bad |
| Dimensional stability of end of press molded body |  | Good | Excellent | Good | Excellent | Excellent | Good | Excellent | Bad | Excellent |
| Amount of generated scrap pieces |  | Good | Excellent | Good | Excellent | Excellent | Good | Excellent | Bad | Excellent | substrate as shown in FIG. 12. The amount of scrap pieces to be generated was large, and production efficiency was poor. FIG. 12 is a plan view of the cut X material. A length 301 is 200 mm, a length 302 is 150 mm, and a length 303 is 600 mm. The results are shown in Table 1.

An extension rate $D_X$ of the X material was 15%.

Comparative Example 2

Production of a molded body was tried in the same manner as in Example 2 except that the Y material was produced as follows, but fluidity of the Y material was low (an extension rate was insufficient), and the molded body could not be produced.

An extension rate $D_X$ of the X material was 15%, and an extension rate $D_Y$ of the Y material was 20%.

(Preparation of Y Material)

A carbon fiber "Tenax" (registered trademark) STS 40-24K (average fiber diameter: 7 μm, single fiber number: 24,000) manufactured by Toho Tenax cut to a fiber length of 18 mm was used as carbon fibers; a nylon 6 resin A1030 manufactured by Unitika Corporation was used as a resin; and a Y material precursor of the carbon fibers and the nylon 6 resin was prepared based on the method described in U.S. Pat. No. 8,946,342 in which the carbon fibers were oriented in two dimensions randomly. The obtained Y material precursor was heated at 2.0 MPa for 5 minutes with a press device heated to 260° C. to obtain a plate-shaped composite material having an average thickness of 1.2 mm. When carbon fibers contained in the plate-shaped composite material are analyzed, the carbon fiber volume fraction (Vf) was 35%, the fiber length of the carbon fibers was a fixed length, and the weight average fiber length was 18 mm. The resin sheet was used as the Y material.

In Examples 1 to 7, since the press molded body is produced by simultaneously pressing the X material and the Y material, bonding strength between the X region and the Y region is excellent, production efficiency is excellent, and a press molded body having a complicated shape can be produced by arranging only the Y material excellent in fluidity in a necessary part. In Examples 1 to 7, the burr generated at the end portion of the press molded body is small, and the dimensional stability of the corner of the end in the in-plane direction is excellent. Further, since the amount of the generated scrap pieces is small, the production efficiency is particularly excellent.

In the press molded bodies obtained in Examples 2, 4, 5, and 7, when a place corresponding to the dash-dot line s in (b) of FIG. 1 was cut, as shown in FIG. 13, the transition segment XY had a configuration in which the X region is sandwiched by the Y regions in the thickness direction, and the end portion in the in-plane direction consisting only of the Y region was formed continuously with the Y region of the transition segment XY (embodiment 1a).

Example 101

(Preparation of Raw Material Substrate)

Carbon fibers "Tenax" (registered trademark) STS 40-24K (average fiber diameter: 7 μm, single fiber number: 24,000) manufactured by Toho Tenax cut to a fiber length of 20 mm were used as carbon fibers; a nylon 6 resin A1030 manufactured by Unitika Corporation was used as a resin; and a composite material of the carbon fibers and the nylon 6 resin was prepared based on the method described in U.S. Pat. No. 8,946,342 in which the carbon fibers were oriented in two dimensions randomly. The obtained composite material was heated at 2.0 MPa for 5 minutes with a press device heated to 260° C. to obtain a plate-shaped raw material substrate having an average thickness of 2.5 mm, a width of 400 mm, and a length of 400 mm. When carbon fibers contained in the plate-shaped raw material substrate were analyzed, the carbon fiber volume fraction (Vf) was 35%, the fiber length of the carbon fibers was a fixed length, and the weight average fiber length was 20 mm (Preparation of X Material)

The raw material substrate was dried with a hot air drier at 120° C. for 4 hours, and then the X material having a size of 248 mm in width×100 mm in height×2.5 mm in thickness was cut from the raw material substrate and prepared.

(Preparation of Y Material)

Extra raw material substrate was prepared and pulverized finely to a 12 mm square by using a large low-speed plastic pulverizer to obtain a particle material R. The particle material R was collected and press molded (heated at 2.0 MPa for 5 minutes with a press device heated to 260° C.), and a Y material having a thickness of 1.6 mm was prepared. The weight average of length of fibers contained in the Y material was measured to be 9 mm. The Y material was dried with a hot air drier at 120° C. for 4 hours, and then one sheet of material (Y1 material) of 66 mm in width×100 mm in height×1.6 mm in thickness and two sheets of material (Y2 material) of 16 mm in width×100 mm in height×1.6 mm in thickness were cut off.

(Preparation of Press Molded Body)

The X material and the Y material (Y1 material and Y2 material) were arranged as shown in FIG. 6, heated to 275° C. by an infrared heater, and pressurized for one minute at a press pressure of 20 MPa (one-second time from start of pressurization to 20 MPa) to produce the press molded body having a shape shown in FIG. 8. Xm in FIG. 6 denotes the X material, Y1 denotes the Y1 material, and Y2 denotes the Y2 material.

Example 102

The X material was prepared in the same manner as in Example 101.

One sheet of a material (Y3 material) having a size of 235 mm in width×42 mm in height×1.6 mm in thickness was cut off and used as the Y material.

The Y3 material was arranged and press molded as shown in FIG. 7 (Xm in FIG. 7 denotes the X material, Y3 denotes the Y3 material, and A2 denotes a region that becomes a top panel of the press molded body having a hat shape). The Y3 material was arranged and pressed so as to fit on a mold surface (A1 in FIG. 5) for forming the top panel having a hat shape. A width of the Y3 material (length in a direction a of FIG. 7, denoted by RA) is the same as a width of the mold surface (RA in FIG. 5) for forming the top panel having a hat shape. Therefore, the press molded body having the shape shown in FIG. 8 could be molded in the same manner as in Example 101 since a pressure was easily applied evenly as compared with the arrangement of FIG. 6 of Example 101 even if molding was performed under a lower pressure.

In Examples 101 and 102, since the press molded body is produced by simultaneously pressing the X material and the Y material, bonding strength between the X region and the Y region is excellent, production efficiency is excellent, and a press molded body having a complicated shape can be produced by arranging only the Y material excellent in fluidity in a necessary part.

INDUSTRIAL APPLICABILITY

The method for producing the press molded body of the present invention can be used in production of various constructional members, for example, structural members of automobiles, various electrical products, and all parts where impact absorption is desired such as a frame or housing of a machine, particularly preferably a press molded body that can be used as an automobile part.

Although the invention has been described in detail with reference to the specific embodiments, it will be apparent to those skilled in the art that various changes and modifications can be made without departing from the spirit and scope of the invention.

The present application is based on Japanese Patent Application No. 2017-249958 filed on Dec. 26, 2017, contents of which are incorporated herein as reference.

REFERENCE SIGN LIST 1, 10: press molded body
X, Xc: X region
Y, Ys, Yb: Y region
F: flange portion
XY: transition segment XY
Xm: X material
2: raw material substrate
3: scrap pieces
Ym, Y1, Y2, Y3: Y material
4: upper mold
5: lower mold
a: transverse direction
b: longitudinal direction
A1: mold surface of lower mold for forming top panel of hat shape
A2: region that becomes top panel of press molded body
A3: top panel of press molded body
RA: width of top panel
Z: region that forms side surface of press molded body
11: X material or Y material
12: wire mesh
13: mounting table

The invention claimed is:

1. A method for producing a press molded body, comprising: heating X material having a pattern shape and containing carbon fibers A having a weight average fiber length $Lw_A$, and a thermoplastic resin $R_X$; heating Y material containing carbon fibers B having a weight average fiber length $Lw_B$ and a thermoplastic resin $R_Y$, the Y material being prepared separately from the X material; and pressing the heated X material and the heated Y material simultaneously in a mold to produce the press molded body comprising an X region made of the X material and a Y region made of the Y material, wherein $$Lw_B < Lw_A,$$

$Lw_B$ is 0.1 mm or more and 15 mm or less, and
the press molded body further comprises a transition segment XY in which the X region and the Y region are laminated; and wherein at least one end portion of the press molded body in an in-plane direction consists of the Y region; and wherein the transition segment XY has a configuration in which the X region is sandwiched by the Y regions in a thickness direction, and the end portion in the in-plane direction consisting only of the Y region is continuously formed with the Y region of the transition segment XY.

2. The method for producing a press molded body according to claim 1,
wherein the $Lw_A$ is 1 mm or more.

3. The method for producing a press molded body according to claim 1, wherein the $Lw_A$ is 1 mm or more and 100 mm or less.

4. The method for producing a press molded body according to claim 1,
wherein a carbon fiber volume fraction $Vf_x$ of the X material and a carbon fiber volume fraction $Vf_Y$ of the Y material satisfy a relationship of $Vf_X > Vf_Y$.

5. The method for producing a press molded body according to claim 1,
wherein the X material has a plate shape and the Y material flows and extends in an in-plane direction of the X material to produce the press molded body.

6. The method for producing a press molded body according to claim 1,
wherein a linear expansion coefficient $E_X$ in a plate thickness direction of a part consisting only of the X region, a linear expansion coefficient $E_{XY}$ in a plate thickness direction of the transition segment XY, and a linear expansion coefficient $E_Y$ in a plate thickness direction of a part consisting only of the Y region satisfy a relationship of $E_X > E_{XY} > E_Y$.

7. The method for producing a press molded body according to claim 1,
wherein an extension rate $D_X$ of the X material is more than 0% and equal to or less than 50%, an extension rate $D_Y$ of the Y material is more than 10% and equal to or less than 60%, and $D_Y > D_X$.

8. The method for producing a press molded body according to claim 1,
wherein a ratio $V_x:V_Y$ of a volume $V_x$ of the X material to a volume $V_Y$ of the Y material is 90:10 to 50:50.

9. The method for producing a press molded body according to claim 1, wherein the $Lw_B$ is 5 mm or more and 15 mm or less.

10. The method for producing a press molded body according to claim 1,
wherein a shape of the X material is a shape developed by inverse molding analysis with a computer from a three-dimensional shape of the press molded body.

11. The method for producing a press molded body according to claim 1,
wherein the X material is cut off from a composite material containing carbon fibers and a thermoplastic resin.

12. The method for producing a press molded body according to claim 11, wherein the Y material includes a material obtained by crushing scrap pieces remaining after the X material is cut off from the composite material.

13. The method for producing a press molded body according to claim 1,
wherein the press molded body has a flange portion, and at least one end portion of the flange portion is the Y region.

14. The method for producing a press molded body according to claim 1,
wherein the press molded body includes a part whose cross-sectional shape is a hat shape.

15. The method for producing a press molded body according to claim 14,
wherein the Y material was arranged on a mold surface in a region for forming a top panel having the hat shape and pressed.

16. The method for producing a press molded body according to claim 1, further comprising:
cutting a raw material substrate containing the carbon fibers A and the thermoplastic resin RX into the X material having the pattern shape.

* * * * *